United States Patent
Hershbarger et al.

(10) Patent No.: US 7,875,093 B1
(45) Date of Patent: Jan. 25, 2011

(54) AIR FILTER ARRANGEMENT FOR AN AGRICULTURAL COMBINE HAVING WITH STATIONARY AND ROTARY FILTERS

(75) Inventors: James Monroe Hershbarger, LeClaire, IA (US); Paul I. Craig, Bettendorf, IA (US); Todd E. Van Hal, Eldridge, IA (US); Nathan R. Vandike, Geneseo, IL (US); Nathan Ogden, Colona, IL (US); Garrick W. Herbst, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/775,798

(22) Filed: May 7, 2010

(51) Int. Cl.
*B01D 45/00* (2006.01)
(52) U.S. Cl. .......................... 55/344; 55/385.3; 55/482; 55/299; 55/297; 55/400; 55/401; 55/418; 55/420; 55/290; 55/282.5; 55/351; 55/485; 55/482.1; 55/301; 95/277; 95/278
(58) Field of Classification Search .................... 55/344, 55/385.3, 482, 299, 294, 297, 284, 400, 401, 55/418, 290, 282.5, 351, 485, 482.1, 301, 55/467, 471; 95/277, 278; 123/198 E
See application file for complete search history.

(56) References Cited

U.S. PATENT DOCUMENTS

| | | | | |
|---|---|---|---|---|
| 2,639,780 A * | 5/1953 | Hardy | ......................... | 55/296 |
| 2,708,920 A * | 5/1955 | Pasturczak | ............... | 123/198 E |
| 3,309,847 A * | 3/1967 | Donaldson | ................. | 55/282.4 |
| 3,816,981 A * | 6/1974 | Carnewal et al. | ........... | 55/282.5 |
| 4,439,218 A * | 3/1984 | Priepke et al. | ................ | 55/288 |
| 4,542,785 A * | 9/1985 | Bagnall et al. | ................. | 165/95 |
| 4,934,449 A * | 6/1990 | Watt et al. | ....................... | 165/41 |
| 5,183,487 A * | 2/1993 | Lodico et al. | .................. | 55/289 |
| 5,217,512 A * | 6/1993 | Williams | ...................... | 96/425 |
| 5,238,473 A * | 8/1993 | Femiani | ....................... | 55/290 |
| 5,285,751 A * | 2/1994 | Liegeois et al. | ........... | 123/41.63 |
| 5,427,502 A * | 6/1995 | Hudson | .................... | 415/211.1 |
| 5,466,189 A * | 11/1995 | Deutsch et al. | ............. | 460/100 |
| 5,595,537 A * | 1/1997 | Jungemann et al. | .......... | 460/100 |
| 5,944,603 A * | 8/1999 | Guinn et al. | ................. | 460/100 |
| 6,068,675 A * | 5/2000 | Tsuda et al. | ................. | 55/385.3 |
| 6,193,772 B1 * | 2/2001 | Wiefel | .......................... | 55/283 |
| 6,202,777 B1 * | 3/2001 | Surridge | .................... | 180/68.1 |
| 6,248,145 B1 * | 6/2001 | Radke | .......................... | 55/295 |
| 6,974,487 B2 * | 12/2005 | Twiefel | ........................ | 55/289 |
| 7,188,599 B2 * | 3/2007 | Chaney et al. | ............ | 123/198 E |
| 7,507,270 B2 * | 3/2009 | Maas et al. | ................. | 55/385.3 |
| 7,682,413 B2 * | 3/2010 | Sheidler | ........................ | 55/345 |
| 2004/0003578 A1 * | 1/2004 | Twiefel | ........................ | 55/289 |
| 2007/0012000 A1 * | 1/2007 | Maas et al. | ................. | 55/385.3 |
| 2008/0016833 A1 * | 1/2008 | Sheidler et al. | ............ | 55/385.3 |
| 2009/0211208 A1 * | 8/2009 | Johnson et al. | ................ | 55/291 |
| 2009/0312079 A1 * | 12/2009 | Good | .......................... | 460/119 |

\* cited by examiner

*Primary Examiner*—Jason M Greene
*Assistant Examiner*—Dung Bui

(57) ABSTRACT

An air filter arrangement for an agricultural combine located on a panel at a side wall of the agricultural combine. The air filter arrangement includes a rotary filter mounted for rotation at a first aperture, a scoop enclosing the rotary filter and blocking substantially all air flow to the rotary filter except at a scoop inlet disposed along an upper edge of the scoop above the rotary filter, and at least one stationary filter disposed to filter air passing through a second aperture in the panel, the stationary filter being located between an upper portion of the rotary filter and the scoop inlet.

9 Claims, 3 Drawing Sheets

AIR FILTER ARRANGEMENT FOR AN AGRICULTURAL COMBINE HAVING WITH STATIONARY AND ROTARY FILTERS

FIELD OF THE INVENTION

This invention related to cooling systems and air filters on agricultural vehicles. More particularly, it relates to the location and arrangement of stationary screens and rotary screens in agricultural combines.

BACKGROUND OF THE INVENTION

Agricultural combines work in environments that are quite dirty. The primary source of the dirt is the combine vehicle itself. As it harvests crop, it crushes and separates dried plant stalks and leaves from the grain or seed produced by the crop plant. The method of separating the grain from material other than grain (MOG) includes blasting the mixed MOG and grain with a high volume of air which billow around the vehicle.

The large volume of dirty air requires a large air inlet with a large cleaning element for engine cooling air. In one arrangement common to many agricultural combines, a large circular screen filter is disposed across an air inlet to the engine radiator and cooling air fan. This screen rotates to continuously clean the screen during operation. The circular screen is typically disposed in a panel that can be opened to provide access to the radiators. The circular screen may also be enclosed with a large scoop that only permits air to flow downward from above the filter in a direction generally parallel to the surface of the filter and into the filter. Relatively clean air from above the vehicle is thereby directed downward across the face of the filter and is pulled into the filter.

U.S. Pat. No. 4,906,262 shows a self-cleaning rotary screen for the cooling inlet of an agricultural combine. The rotary screen is generally planar and circular and is disposed slightly inside the side walls of the combine.

U.S. Pat. No. 4,233,040 is directed to a self-cleaning rotary filter for the cooling air inlet of an engine enclosure that is fixed to a hinged and generally rectangular panel on the side of an agricultural combine. The panel that supports the rotary filter can be pivotally opened, about a vertical axis defined by two hinges to provide access to the cooling package of the engine.

US2006/0283157 is directed to a self-cleaning rotary filter disposed on a rectangular panel that is fixed to the side of an agricultural combine. A shroud or shield is provided around the rectangular panel (FIG. 1) to limit airflow into the rotary filter. The shroud provides an opening above the panel on which the rotary filter is mounted such that are entering the filter must flow down from directly above the filter.

In each of these arrangements, all of the cooling air is sucked through the rotary filter, which is smaller than the size of the rectangular panel on which the rotary filter is mounted.

The problem the present invention is intended to solve is that of the limited airflow to a cooling package that is provided by a rotary screen installed in a rectangular panel. It is an object of this invention to solve that problem.

SUMMARY OF THE INVENTION

In accordance with a first aspect of the Invention, an air filter arrangement for an agricultural combine is provided that includes a generally rectangular panel supported on hinges on an outer side wall of a combine, a rotary filter mounted for rotation and enclosing a first aperture in the panel to filter air passing through said first aperture; a scoop disposed to enclose the rotary filter and block substantially all air flow to the rotary filter except at a scoop inlet disposed along an upper edge of the scoop above the rotary filter; at least one stationary filter disposed to filter air passing through a second aperture in the panel, said stationary filter being disposed between an upper portion of said rotary filter and the scoop inlet.

The rotary filter may be generally planar and self-cleaning. The stationary filter may be generally triangular. The stationary filter may be disposed at least partially in front of a first corner of a rectangular radiator not covered by the rotary filter. The air filter arrangement may further comprise a second stationary filter disposed in front of a second corner of a rectangular radiator not covered by the rotary filter. In this way air flow to the two upper corners of the rectangular radiator can be enhanced.

A flow of air through said rotary filter is sufficient to clean said stationary filter. The flow of air is downward across the surface of the stationary filter.

The stationary filter may be generally coplanar with the panel. The rotary filter may be generally coplanar with the panel.

DETAILED DESCRIPTION OF THE PREFERRED EMBODIMENTS

Figure 1:
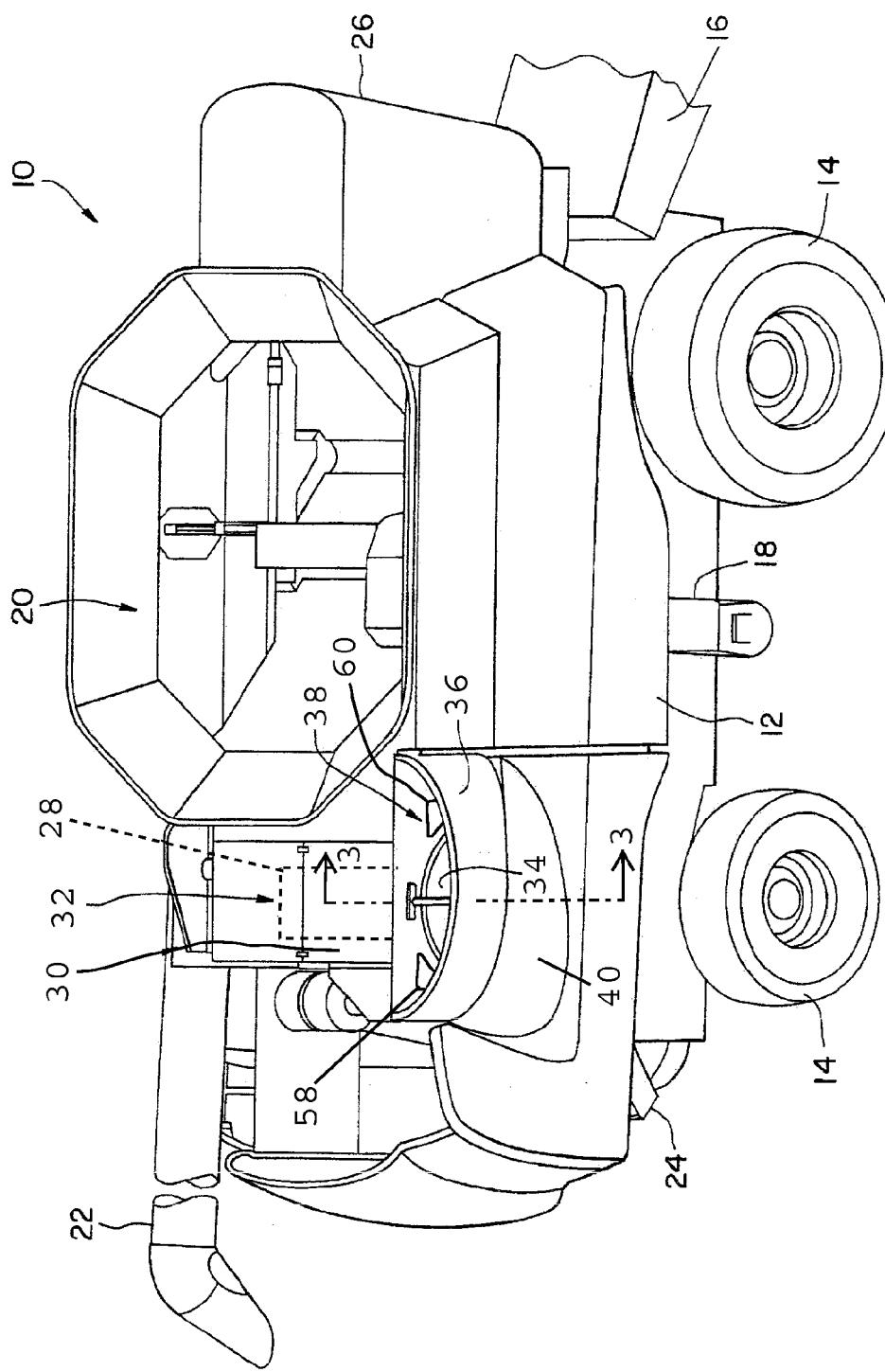
FIG. 1 is an elevated right side view of an agricultural combine in accordance with the present invention.

Agricultural combine 10 includes a supporting structure or body 12 having ground engaging wheels 14 extending from body 12. Although combine 10 is illustrated as having wheels 14, it could also have ground engaging tracks, either full tracks or half tracks. A harvesting platform (not shown), such as a soybean head or corn head, is used for harvesting a crop and directing it to a feederhouse 16. The harvested crop is directed by feederhouse 16 to internal workings of combine 10 not specifically shown in FIG. 1, such as an axial crop processing unit which threshes and separates the harvested crop material. Grain and chaff fall through grates below the crop processing unit to a cleaning system which removes the chaff and directs the clean grain via a clean grain elevator 18 to grain hopper 20. The clean grain in hopper 20 is typically unloaded into a gravity wagon or truck using unloading auger 22. The threshed and separated crop material other than the grain is transported via a discharge beater to a straw chopper 24, which chops and flails the non-grain material back to the field. The operation of combine 10 is controlled from an operator's cab 26.

Mechanical power for combine 10 is provided by an IC engine 28 carried by body 12. IC engine 28 is substantially enclosed within an engine compartment 30. In one embodiment, the engine compartment is in the form of an engine housing 32 which substantially surrounds and is manufactured with IC engine 28.

A rotary self-cleaning air filter 34 is fixed to a panel of engine housing 32 just in front of IC engine 28. An air scoop 36 is positioned adjacent the upstream side of air filter 34. Air scoop 36 has an inlet 38. Air scoop inlet 38 is positioned above the housing of IC engine 28, and is positioned near or above the top of combine body 12. Typically, chaff and dust laden air is stirred up by the combine IO operation and billows several feet above the ground level. By positioning air scoop inlet 38 above the height of combine body 12, the air which is used in IC engine 28 is substantially cleaner. This in turn reduces the amount of foreign matter which must be screened and filtered from the incoming air.

Air scoop 36 has a generally L-shaped flow path defined by outer wall 40. The L-shaped flow path directs the incoming air from a generally vertically downward direction to a generally horizontal direction entering air filter 34.

Air scoop 36 encloses the bottom, the left side in the right side of the air filter, leaving only a top space between the air scoop 36 and the side wall of the agricultural combine 10 open to receive air and feed the air filter.

Figure 2:
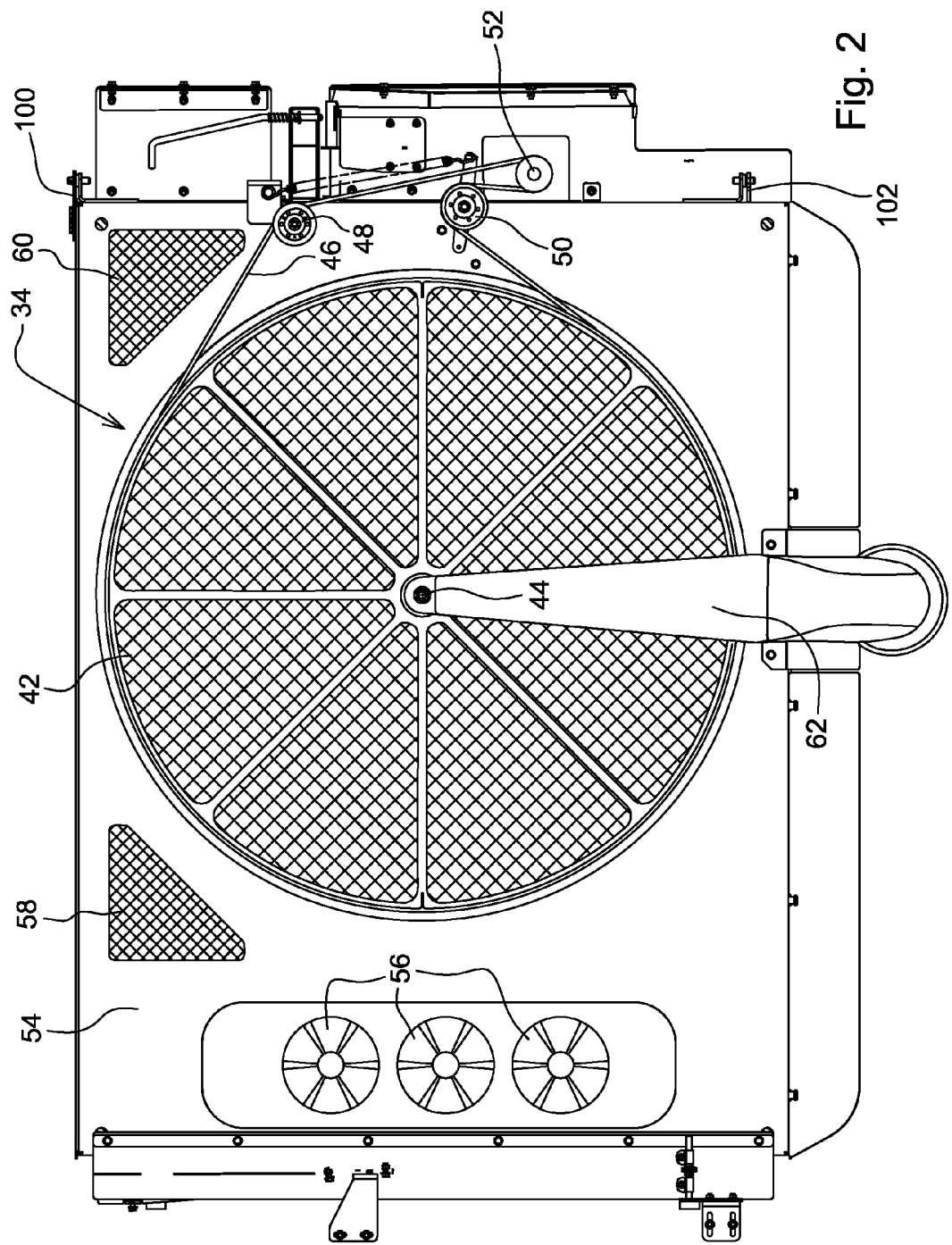
FIG. 2 is a close-up right side view of the agricultural combine of FIG. 1 showing the air filter and associated cooling air apertures with the scoop removed.

Referring now to FIG. 2, the air filter 34 is mounted for rotation on a rectangular panel 54. Panel 54 is supported against an opening in the engine housing by hinges 100, 102 that together define a vertical hinge axis. Panel 54 can be swung open on its hinges about the vertical hinge axis to expose the front of the radiators and other coolers disposed immediately behind the panel 54 thereby permitting them to be cleaned and maintained. Panel 54 also includes three air inlets 56 disposed to one side of the air filter 34 that provide the engine with combustion air.

Air filter 34 is in the form of a circular screen 42 supported for rotation a horizontal and transversely extending central axis 44 and is driven in rotation about that axis by a drive belt 46. Drive belt 46 is supported on rollers 48, 50 and extends around a driven shaft 52 that is powered by a jack shaft from the engine (not shown).

Immediately above and on each side of air filter 34 are two triangular air inlets 58, 60 here shown as apertures in panel 54. These air inlets are covered with a screen mesh to filter the air. The screen mesh is generally planar and co-planar with panel 54. The air inlets 58, 60 are disposed above portions of the air filter 34. By locating air inlets 58, 60 between the air filter 34 and its source of air (scoop inlet 38), a strong air current is formed that passes over the top surface of air inlets 58, 60 on its way to air filter 34.

This strong current of air serves to strip plant matter from the surface of air inlets 58, 60, keeping air inlets 58, 60 clean of plant matter.

The mechanism provided to clean the air filter 34 is a suction vent 62 that extends across the outer surface of air filter 34 from a point on the periphery of air filter 34 to its central axis 44 about which air filter 34 rotates. Suction vent 62 is provided with a vacuum that sucks debris off the surface of air filter 34 whenever air filter 34 rotates underneath suction vent 62.

Figure 3:
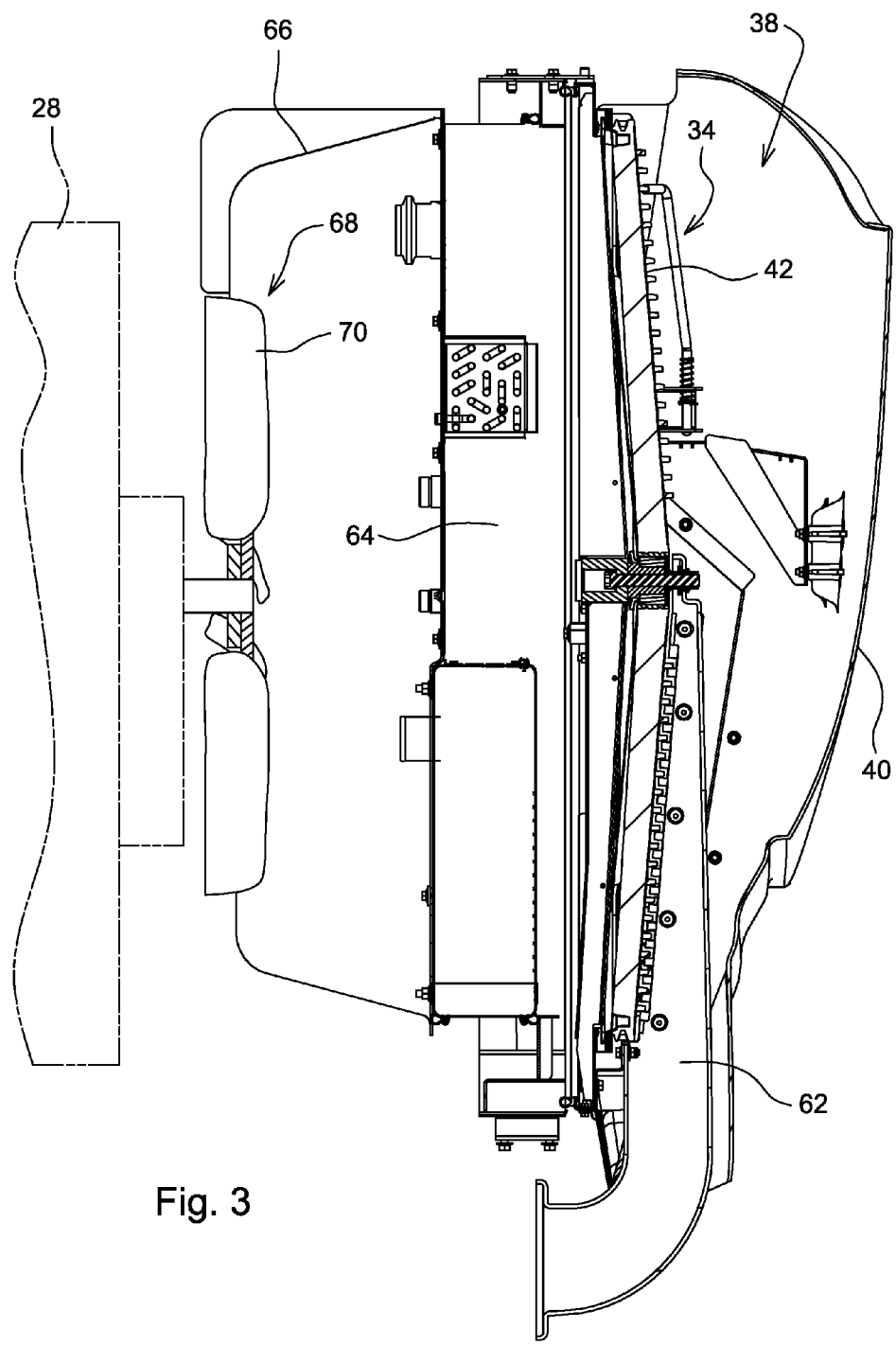
FIG. 3 is a cross-sectional view through the air filter and scoop arrangement taken at section line 3-3 in FIG. 1 showing the airflow into the scoop and the air filters.

FIG. 3 is a cross-sectional side view of agricultural combine 10 with all the components removed except for the engine cooling package and engine. Air filter 34 is disposed immediately in front of a rectangular radiator 64. Rectangular radiator 64 is surrounded by a shroud 66 on its backside that has an aperture 68 in which a cooling fan 70 is placed. The cooling fan 70 pulls air downward into the inlet 38 at the top of air scoop 36, through air inlets 58, 60 and air filter 34, through the rectangular radiator 64 and then across the IC engine 28 disposed immediately behind fan 70.

The rectangular dimensions of radiator 64 are greater than the diameter of the circular screen 42, thereby causing the two upper corners of rectangular radiator 64 to extend beyond the circumference of air filter 34. Air inlets 58, 60 are disposed in the panel beyond the circumference of circular screen 42 and in front of the corners of the rectangular radiator 64, thus enhancing air flow through the corners of the radiator.

The invention claimed is:

1. An air filter arrangement for an agricultural combine, comprising:

a generally rectangular panel supported on hinges on an outer side wall of a combine, the panel having a plurality of apertures therethrough for conducting cooling air into an engine compartment of the agricultural combine a rotary filter mounted on said panel for rotation at a first aperture in the panel to filter air passing through said first aperture;

a scoop disposed to enclose the rotary filter and block substantially all air flow to the rotary filter except at a scoop inlet disposed along an upper edge of the scoop above the rotary filter; and at least one stationary filter mounted on said panel disposed to filter air passing through a second aperture in the panel, said stationary filter being disposed between an upper portion of said rotary filter and the scoop inlet.

2. The air filter arrangement for an agricultural combine of claim 1 wherein the rotary filter is generally planar and self-cleaning.

3. The air filter arrangement of claim 1, wherein the stationary filter is generally triangular.

4. The air filter arrangement of claim 3, in which the stationary filter is disposed at least partially in front of a first corner of a rectangular radiator not covered by the rotary filter.

5. The air filter arrangement of claim 3, wherein said at least one stationary filter includes a second stationary filter disposed in front of a second corner of a rectangular radiator not covered by the rotary filter.

6. The air filter arrangement of claim 4, further comprising an engine cooling fan disposed behind the rectangular radiator to draw air through the radiator and through the rotary filter and through said at least one stationary filter, wherein a flow of air through said rotary filter is capable to clean said at least one stationary filter.

7. The air filter arrangement of claim 6, where in the flow of air is downward across the surface of said at least one stationary filter.

8. The air filter arrangement of claim 1, wherein said at least one stationary filter is generally coplanar with the panel.

9. The air filter arrangement of claim 8, wherein the rotary filter is generally coplanar with the panel.

\* \* \* \* \*